Figure 1:
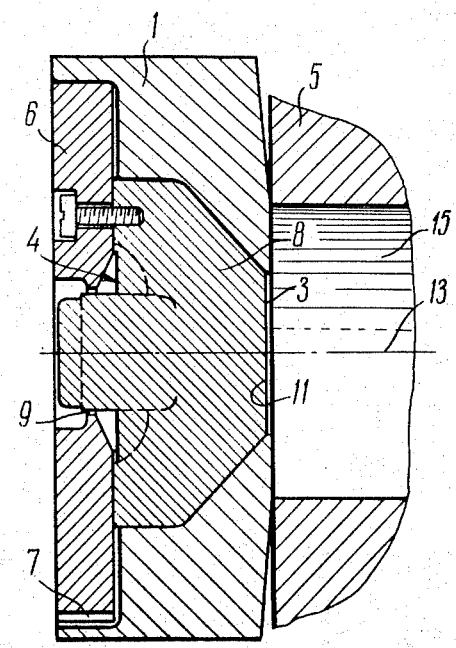

United States Patent [19]
Alexandrov et al.

[11] 3,777,544
[45] Dec. 11, 1973

[54] TOOL OUTFIT FOR EXTRUDING HOLLOW SHAPES

[76] Inventors: Alexandr Sergeevich Alexandrov, Vyazemskaya, 6, kv. 51, Moscow; Vadim Dmitrievich Schegolevatykh, Sadovaya ulitsa, 172, kv. 3, Kuibyshev; Vyacheslav Ivanovich Saveliev, Spartakovskaya ulitsa, 16, kv. 7; Mikahil Fedorovich Zakharov, ulitsa Tolbukhina, 12, kv. 84, both of Moscow, all of U.S.S.R.

[22] Filed: Oct. 15, 1971

[21] Appl. No.: 189,591

[52] U.S. Cl. ................................. 72/468, 72/269
[51] Int. Cl. ............................................. B21c 3/06
[58] Field of Search .................... 72/467, 468, 269

[56] References Cited
UNITED STATES PATENTS

| | | | |
|---|---|---|---|
| 2,638,213 | 5/1953 | Clark | 72/269 |
| 2,664,996 | 1/1954 | Andrews | 72/468 |
| 2,164,397 | 7/1939 | Ganoe | 72/467 |

*Primary Examiner*—Charles W. Lanham
*Assistant Examiner*—Robert M. Rogers
*Attorney*—Eric H. Waters et al.

[57] ABSTRACT

A tool outfit with a holder enclosing a die and a splitter fastened in the holder inner cavity.

The holder inner cavity has the shape formed by rotating a curve of the second order about a geometric axis of extrusion and tapering in the direction of the holder inlet and outlet.

2 Claims, 2 Drawing Figures

TOOL OUTFIT FOR EXTRUDING HOLLOW SHAPES

The present invention relates to metal working and more particularly to tool outfits for extruding hollow shapes of readily deformed alloys.

It would be most expedient to employ the tool outfit for extruding hollow shapes, produced in compliance with the present invention, for extruding hollow shapes of aluminium and its alloys.

Widely known are tool outfits for extruding hollow shapes comprising a holder with an inner cavity, an inlet and an outlet. — on Fastened in the holder cavity from the outlet side are a die and a splitter. The latter is arranged in the inner cavity so that its front edge does not project beyond the limits of the holder inlet. The inner cavity of the holder is cone-shaped with its smaller base located on the inlet side, adjacent to a container liner, and a large one —one the die side and with the holder inlet and container liner hole being similar in size.

A disadvantage of the known tool outfit lies in that it fails to ensure large yields due to discard produced after the extruding operations and amounting to 15–30 percent of the length of the metal billet being extruded.

Another disadvantage, peculiar to the known tool outfit, is the fact that a geometric profile of the inner cavity of the holder does not assure reestablishment of intercrystalline bonds in the metal being extruded, which in turn adversely affects mechanical properties both of longitudinal and transverse butt joints of the workpiece to be extruded, whereas no counter pressure both in the die hole and in the holder inlet results in that the air enclosed in the container of an extrusion press, is entrapped in substantial amounts into the metal to be extruded which also tends to impair quality of extrusions.

It is an object of the present invention to enhance quality of the extrusions produced. outlet, Another object of the present invention is to increase the yields, i.e., to reduce discard after extrusion.

According to the specified and other objects of this invention in a tool outfit proposed herewith for extruding hollow shapes of readily deformed alloys, comprising a holder with an inlet and an outlet and with an inner cavity accommodating a die, located on the outlet side, and a splitter, with the latter arranged in the cavity so that its front edge does not protrude beyond the limits of the holder outletl, conforming to this invention, the inner cavity has a form developed by rotating a curve of the second order about an imaginary axis of extruding and tapering in the direction of the holder inlet and outlet.

It would be sound practice to restrict the inner chamber of the holder by segmental half liners set up inside of the holder on either side of the splitter to adjoin the die butt end.

The above arrangement of the inner cavity of the holder is most effective in terms of technology and ease of production of the tool outfit.

The tool outfit for extruding hollow shapes brought about in compliance with the present invention enables the extruding operation to be carried out continuously, ensures high quality of metal in a transverse butt joint of the extrusion, with the metal not differing as fast as its mechanical properties are concerned from those of a solid part and with the extrusion surface having no traces whatsoever of a butt joint between two billets.

In addition, the desion of the given tool outfit makes it possible to reduce the amount of discard in extruding, together with ends cropped after straightening, to 10 percent.

Figure 2:
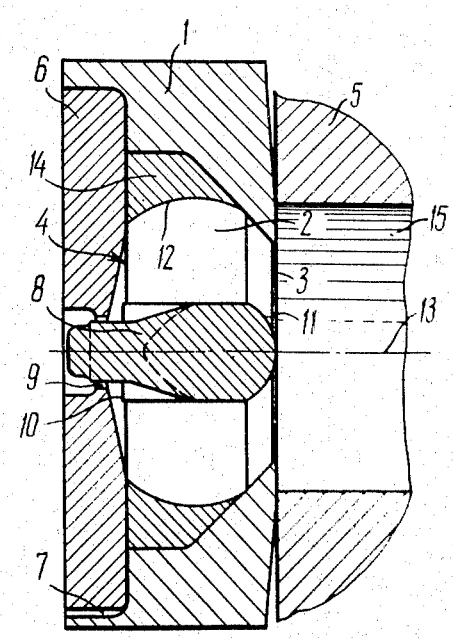

Described below is an exemplary embodiment of the present invention to be considered with due reference to accompanying drawings, in which:

FIG. 1 shows a longitudinal section by a horizontal plane of a tool outfit for extruding hollow workpieces;

FIG. 2 — ditto, a longitudinal section by a vertical plane.

A tool outfit for extruding hollow shapes of aluminium base alloys comprises holder 1 (FIGS. 1 and 2) with inner cavity 2. The cavity terminates from one side with inlet 3 and from another - with outlet 4. Bordering on holder 1 from inlet 3 side is container 5 in which the billet to be extruded (not shown) is placed. Arranged in holder 1 from outlet 4 side is die 6, coupled to the holder with aid of key joint 7, and splitter 8. The latter is made fast with respect to hole 9 of die 6 by means of slots 10 provided in die 6. Splitter 8 is located in inner cavity 2 so that its front edge 11 does not project beyond the limits of inlet 3 of holder 1. The above arrangement of splitter 8 keeps it from being damaged in service by a dummy block (not shown).

Inner cavity 2 of holder 1 has the shape produced by rotating curve 12 of the second order, which in our example is a part of an arc of an ellipse revolving about geometric axis 13 of extruding. Cavity 2 is tapering in the direction of inlet 3 and outlet 4.

In order to increase technological effectiveness of holder 1 in the process of production its inner cavity 2 is restricted by segmental half-liners 14 set up in the holder on either side of splitter 8 and bordering on the butt end of die 6 from outlet 4 side.

The above conceptual design of inner cavity 2 of holder 1 provides for the reestablishment of intercrystalline bonds which in turn assures high quality of metal in transverse butt and longitudinal joints of the extrusion.

To prevent the air enclosed in container 5 from being entrapped into the extrusion the ratio of areas of inlet 3 to hole 15 in the container shall not exceed 0.5.

The tool outfit for extruding hollow shapes functions in the following manner.

On assembling and heating to a requisite temperature the tool outfit is set up on an extrusion press (not shown). A metal billet (not shown) heated to an extrusion temperature is placed into container 5 following which extrusion is initiated. The billets are extruded without any discard left, i.e., until the dummy block approaches the butt end of holder 1. After the billet has been extruded, container 5 is taken aside, the dummy block is pushed out and removed from the press. The butt end of holder 1 is protected from a metal film after which the extruding cycle is repeated.

Thus it is possible to produce an extrusion of unrestricted length. The metal forced into inner cavity 2 of holder 1 of the tool outfit is intermixed which provides for reestablishment of intercrystalline bonds in the metal being extruded and counter pressure developed in both hole 9 of die 6 and inlet 3 of holder 1 prevent the air from being entrained from container 5 in the metal being extruded.

As front edge 11 of splitter 8 does not protrude beyond the limits of inlet 4 in holder 1 the dummy block comes up close to the butt end of holder 1, and the metal saturated with air will remain on the edges of the dummy block and in the form of a thin easily removable film, about 1–2 mm thick, on the holder butt end.

What we claim is:

1. A tool outfit for extruding hollow shaped of readily deformed alloys comprising: a holder with an inner cavity terminating with an inlet and an outlet; said inner cavity having a configuration defined by a curve of rotation of the second order about a geometric axis of extrusion and being tapered in the direction of said inlet and outlet; a die secured in said holder on the side of said outlet; a splitter coupled with said die and positioned in said inner cavity so that its front edge does not protrude beyond the limits of said inlet.

2. A tool outfit of claim 1 in which the inner cavity of the holder is restricted by segmental half liners located in it on either side of the splitter and bordering on the die butt end.

* * * * *